April 29, 1930.  M. BATTEGAY  1,756,532
MANUFACTURE OF NITRIC ACID
Filed Feb. 3, 1927
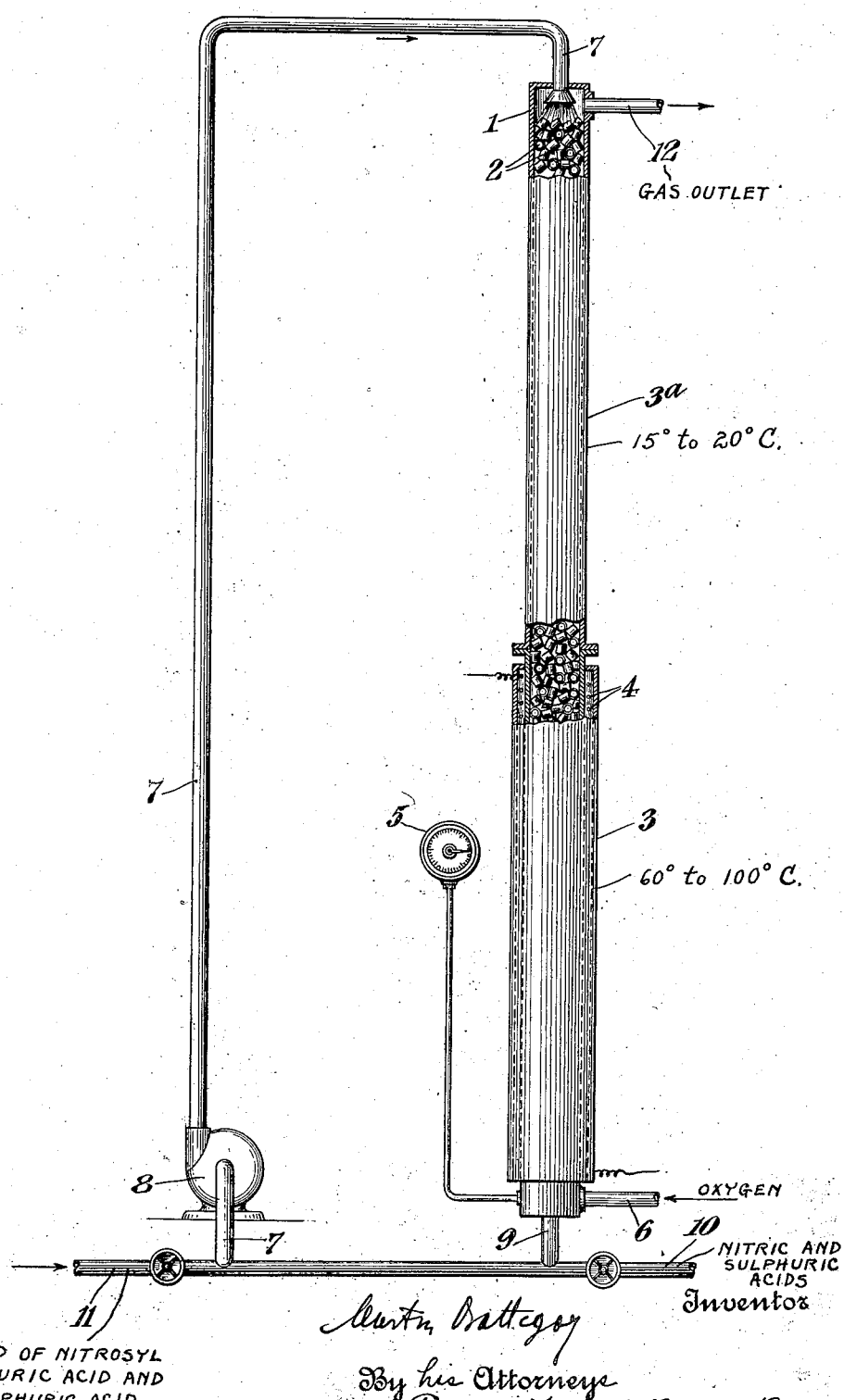

Patented Apr. 29, 1930

1,756,532

UNITED STATES PATENT OFFICE

MARTIN BATTEGAY, OF MULHOUSE, HAUT-RHIN, FRANCE, ASSIGNOR, BY MESNE ASSIGNMENTS, TO THE CALCO CHEMICAL COMPANY, INC., A CORPORATION OF DELAWARE

MANUFACTURE OF NITRIC ACID

Application filed February 3, 1927, Serial No. 165,594, and in France October 19, 1926.

My invention relates particularly to an improved process for the manufacture of nitric acid, and has relation to the manufacture of nitric acid generally, but has especial application to the manufacture of nitric acid from mixtures made by absorbing nitrogen peroxide in sulphuric acid and without depending upon the use of electrolysis.

The present invention comprises a specific modification of the main invention relating to the above subject matter, and which is set forth in my co-pending application upon process for the manufacture of nitric acid, executed on the 2nd day of December, 1926.

The object of my invention is to provide a process for the manufacture of nitric acid having many advantages over previous processes. Another object of my invention is to provide an improved process for the manufacture of nitric acid and particularly mixtures containing the same, not involving the use of electrolytic means, and which is based upon the conversion of nitrosyl sulphuric acid to nitric acid, but it has relation, also, especially to the manufacture of nitric acid from mixtures in which the nitrosyl sulphuric acid has been made by introducing nitrogen peroxide, $N_2O_4$, into sulphuric acid.

Hitherto, the manufacture of nitric acid from peroxide of nitrogen has been carried out exclusively by absorbing peroxide of nitrogen in water. In that process reactions occur, the result of which may be indicated by the following reactions:

$$2NO_2 + O + H_2O = 2HNO_3$$
$$6NO_2 + 3H_2O = 3HNO_3 + 3HNO_2$$
$$3HNO_2 = 2NO + HNO_3 + H_2O$$

In other words, there is always in that process an intermediate formation of nitrous acid, which, being unstable, forms for every mole of water and every mole of nitric acid, two moles of nitric oxide, NO. The nitric oxide must then be reoxidized and reabsorbed to prevent considerable losses of oxides of nitrogen and, consequently, poor yield of nitric acid. The processes based on the absorption of nitrogen peroxide in water are difficult and complex. They are expensive and cumbersome, not only because of the initial cost of the apparatus but, also, because the upkeep is high in those processes.

The present invention is directed, therefore, to overcoming these difficulties and this I have accomplished by discovering that nitrosyl sulphuric acid, and especially nitrosyl sulphuric acid formed by the solution of nitrogen peroxide in sulphuric acid of the proper concentration, can be readily oxidized notwithstanding its great stability therein. I may carry out such oxidation, either by the introduction of atmospheric oxygen or pure molecular or atomic oxygen, any one or more of which sources of oxygen may be used alone or together with one or more other gases or liquids or inert materials. Or such oxidation may be carried out by the use of any other oxidizing agent or agents. This oxidation, based upon the introduction of oxygen, can be carried out in the presence or absence of catalysts, as desired, as, for example, with the aid of materials containing vanadium, chromium, cerium, etc., such as ammonium metavanadate, $NH_4VO_3$, chromic anhydride, $CrO_3$, cerium dioxide, $CeO_2$, etc. The general final reaction of the oxidation of the nitrosyl sulphuric acid can be represented as follows:

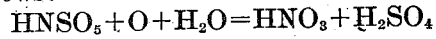
$$HNSO_5 + O + H_2O = HNO_3 + H_2SO_4$$

showing that the concentration of the sulphuric acid is increased accordingly, and that the sulphuric acid originally used in the process is substantially completely recovered.

Also, if desired, the oxidation of the nitrosyl sulphuric acid into sulphuric acid and nitric acid can be carried out in spent sulphuric acid such as is obtained in the nitration of organic compounds by means of nitrogen peroxide in the presence of sulphuric acid, or by means of mixed acids obtained by absorbing nitrogen peroxide in sulphuric acid, or in spent acids obtained from other nitrating processes. When nitrogen peroxide is dissolved in sulphuric acid, the former acts like a mixed anhydride of nitrous and nitric acid, as set forth in the following reaction:

$$N_2O_4 + H_2SO_4 \rightleftarrows HNOSO_4 + HNO_3$$

which is reversible, giving free nitric acid and nitrosyl sulphuric acid. In bringing about this reaction the concentration and temperature of sulphuric acid should be such as to insure absorption of $N_2O_4$ and avoid the loss of oxides of nitrogen. For example, the concentration of sulphuric acid should be above about 70% by weight and the temperature should not be above 30° C.

The oxidation by the introduction of oxygen in one of its forms as above referred to, or mixed with any one of the above kinds of materials, can be carried out in any suitable apparatus permitting the intimate contact of the sulphuric acid containing nitrosyl sulphuric acid with the oxygen. For instance, for this purpose I may use a vertical column provided with Raschig rings, or other suitable filling materials in which the sulphuric acid liquor descends against a countercurrent of ascending oxidizing gases. The temperatures used in the column will depend upon the concentrations of the sulphuric acid and nitrosyl sulphuric acid, conditions being chosen so as to avoid any substantial decomposition or volatilization of the nitric acid formed.

My invention is capable of being carried out in many different ways but for the purpose of illustration I shall describe only certain ways of carrying out the same hereinafter, and it is also capable of being carried out in connection with many different types of apparatus but for the purpose of illustration I have shown only certain types of apparatus for use in connection therewith in the accompanying drawing, in which—

The figure is a diagrammatic representation of an apparatus for use in accordance with my invention, based upon the introduction of oxygen in one or more of its forms for effecting the oxidation.

For example, in carrying out my invention, when using an apparatus such as is shown in the figure, I may proceed as follows:

*Example 1*

A solution of 92 parts by weight of nitrogen peroxide in 773 parts by weight of 84.5% strength sulphuric acid of a specific gravity of $d=1.780$, or a spent acid contained in nitration containing about the same percentage of nitrosyl sulphuric acid, that is to say 14.7% by weight of nitrosyl sulphuric acid, is circulated from the top to the bottom in a vertical column 1 made of an acid-proof material, such, for example, as ferrosilicon, and provided with a filling material, such, for example, as Raschig rings 2 of earthenware or porcelain. Although the dimensions of the column may be varied, the column may, for example, be 6 meters in height and the diameter at the inside may be 30 centimeters, said column consisting of a lower section 3, the height of which is 3 meters, and an upper section $3^a$, which is 3 meters high. The section 3 may be heated by any suitable means, for instance, an electric resistance heater 4, or in any other way, so as to heat the liquid in the lower section 3 to a temperature varying between 60 and 110° C., as shown by a recording thermometer 5. Through an inlet pipe 6 at the bottom of the column 1 a pure and well-dried current of oxygen is introduced, and ascending meets the descending liquid which is fed into the top of the column. The liquid is supplied through a pipe 7, having a pump 8, communicating with an outlet pipe 9 at the bottom of the column having a valved branch pipe 10 for the ultimate draw-off of the liquid from the column, and a valved branch inlet pipe 11 for the introduction of fresh liquid to be treated. The descending liquid in the column 1 cools the ascending gas in the upper part of the column $3^a$ and consequently reabsorbs any oxides of nitrogen which may be given off and carried along in the column. Such cooling may be assisted by the outside air as shown in the drawing, or by any other suitable cooling means. The oxygen gas is preferably used in such excess that there is a substantially complete absence of oxides of nitrogen at the gas outlet 12 provided at the top of the column. If desired, the excess of oxygen can be recovered and used over again, or it may be used in any desired way. The rate of flow of the oxygen introduced is such that with the cooling provided, the temperature at the upper part of the column and in the exit gases does not exceed -15 to 20° C. Furthermore, the upper part of the section $3^a$ is substantially free from unabsorbed red fumes of nitrogen peroxide. These red fumes may, however, appear in the portion of the section $3^a$ of the column adjacent to the heated section 3. It will be understood, also, that the rate of flow of sulphuric acid liquor is dependent upon the height of the column, and the temperature used in the heated section. In the above column, which is 6 meters in height, with the lower section heated to 80° C., and when sulphuric acid liquor of the above composition has circulated for two hours at such a rate that the volume of the acid has passed twice through the column, that is to say, when the column is operated as above described, a sample of the acid shows 67.58% oxidation of the nitrosyl sulphuric acid originally present. After three hours of circulation of the same, 82.3% of nitrosyl sulphuric acid have been oxidized to nitric acid and a little later the oxidation can be considered as substantially complete. The mixture of nitric and sulphuric acid obtained can be used in the usual nitration processes, if desired, or instead, if desired, the nitric acid can be extracted by any one of the known methods, such, for instance, as distillation.

*Example 2*

In this example of my invention the process may be carried out just as described in connection with Example 1 except in this instance atmospheric oxygen or air is used instead of the oxygen there described, and very similar results are obtained by conducting the process otherwise the same as in Example 1 except for the lengthening of the time of circulation by about 50% of the time described in connection with Example 1.

*Example 3*

In this example of my invention the process is carried out the same as in Example 2 except that to each liter of sulphuric acid liquor there is added 2 cubic centimeters of a 0.2% solution in water of ammonium metavanadate, and except, also, that in this instance the time cycle is shortened to about two-thirds of the time set forth under Example 2.

*Example 4*

In carrying out my invention in accordance with this example I proceed exactly the same as under Example 2 except, instead, I use, in place of the air, an oxygen gas mixed with 50% of its weight of nitrogen or carbon dioxide, the results obtained being substantially the same.

While I have described my invention above in detail I wish it to be understood that many changes may be made therein without departing from the spirit of the same.

I claim:

1. The process which consists in forming nitric acid by the oxidation of liquid nitrosyl sulphuric acid in sulphuric acid by means of oxygen led into the liquid nitrosyl sulphuric acid and sulphuric acid so that the oxygen acts directly upon the nitrosyl sulphuric acid.

2. The process which consists in forming nitric acid by the oxidation of a nitrosyl sulphuric acid solution formed by dissolving nitrogen peroxide in sulphuric acid by means of oxygen led into the liquid nitrosyl sulphuric acid and sulphuric acid so that the oxygen acts directly upon the nitrosyl sulphuric acid.

3. The process which consists in forming nitric acid by the oxidation, in the presence of a catalyst, of liquid nitrosyl sulphuric acid in sulphuric acid by means of oxygen led into the liquid nitrosyl sulphuric acid and sulphuric acid so that the oxygen acts directly upon the nitrosyl sulphuric acid.

4. The process which consists in forming nitric acid by the oxidation, in the presence of a catalyst, of a nitrosyl sulphuric acid solution formed by dissolving nitrogen peroxide in sulphuric acid by means of oxygen led into the liquid nitrosyl sulphuric acid and sulphuric acid so that the oxygen acts directly upon the nitrosyl sulphuric acid.

5. The process which consists in forming nitric acid by the oxidation of liquid nitrosyl sulphuric acid in sulphuric acid by means of oxygen led into the nitrosyl sulphuric acid and sulphuric acid so that the oxygen acts directly upon the nitrosyl sulphuric acid, the concentration and temperature of the sulphuric acid used being such as to avoid the loss of compounds of nitrogen in the oxidation.

6. The process which consists in forming nitric acid by the oxidation of a nitrosyl sulphuric acid solution formed by dissolving nitrogen peroxide in sulphuric acid by means of oxygen led into the nitrosyl sulphuric acid and sulphuric acid so that the oxygen acts directly upon the nitrosyl sulphuric acid the concentration and temperature of the sulphuric acid used being such as to avoid the loss of compounds of nitrogen in the oxidation.

7. The process which consists in forming nitric acid by the oxidation, in the presence of a catalyst, of liquid nitrosyl sulphuric acid in sulphuric acid by means of oxygen led into the nitrosyl sulphuric acid and sulphuric acid so that the oxygen acts directly upon the nitrosyl sulphuric acid, the concentration and temperature of the sulphuric acid used being such as to avoid the loss of compounds of nitrogen in the oxidation.

8. The process which consists in forming nitric acid by the oxidation of a nitrosyl sulphuric acid solution formed by dissolving nitrogen peroxide in sulphuric acid by means of oxygen led in countercurrent in a column into the liquid nitrosyl sulphuric acid and sulphuric acid so that the oxygen acts directly upon the nitrosyl sulphuric acid.

9. The process which consists in forming nitric acid by the oxidation, in the presence of a catalyst, of liquid nitrosyl sulphuric acid in sulphuric acid by means of oxygen led in in countercurrent in a column into the liquid nitrosyl sulphuric acid and sulphuric acid so that the oxygen acts directly upon the nitrosyl sulphuric acid.

10. The process which consists in forming nitric acid by the oxidation, in the presence of a catalyst, of a nitrosyl sulphuric acid solution formed by dissolving nitrogen peroxide in sulphuric acid by means of oxygen led in countercurrent in a column into the liquid nitrosyl sulphuric acid and sulphuric acid so that the oxygen acts directly upon the nitrosyl sulphuric acid.

11. The process which consists in forming nitric acid by the oxidation of liquid nitrosyl sulphuric acid in sulphuric acid by means of oxygen led in countercurrent in a column into the liquid nitrosyl sulphuric acid and sulphuric acid so that the oxygen acts directly upon the nitrosyl sulphuric acid, the oxygen being supplied in such excess as to avoid the presence of oxides of nitrogen at the top of the column.

12. The process which consists in forming nitric acid by the oxidation of a nitrosyl sulphuric acid solution formed by dissolving nitrogen peroxide in sulphuric acid by means of oxygen led in countercurrent in a column into the liquid nitrosyl sulphuric acid and sulphuric acid so that the oxygen acts directly upon the nitrosyl sulphuric acid, the oxygen being supplied in such excess as to avoid the presence of oxides of nitrogen at the top of the column.

13. The process which consists in forming nitric acid by the oxidation, in the presence of a catalyst, of liquid nitrosyl sulphuric acid in sulphuric acid by means of oxygen led in countercurrent in a column into the liquid nitrosyl sulphuric acid and sulphuric acid so that the oxygen acts directly upon the nitrosyl sulphuric acid, the oxygen being supplied in such excess as to avoid the presence of oxides of nitrogen at the top of the column.

14. The process which consists in forming nitric acid by the oxidation, in the presence of a catalyst, of a nitrosyl sulphuric acid solution formed by dissolving nitrogen peroxide in sulphuric acid by means of oxygen led in countercurrent in a column into the liquid nitrosyl sulphuric acid and sulphuric acid so that the oxygen acts directly upon the nitrosyl sulphuric acid, the oxygen being supplied in such excess as to avoid the presence of oxides of nitrogen at the top of the column.

15. The process which consists in forming nitric acid by the oxidation of liquid nitrosyl sulphuric acid in sulphuric acid by means of oxygen led in countercurrent in a column into the liquid nitrosyl sulphuric acid and sulphuric acid so that the oxygen acts directly upon the nitrosyl sulphuric acid, the oxygen being supplied in such excess as to avoid the presence of red fumes at the top of the column.

16. The process which consists in forming nitric acid by the oxidation in the presence of a catalyst, of liquid nitrosyl sulphuric acid in sulphuric acid by means of oxygen led in countercurrent in a column into the liquid nitrosyl sulphuric acid and sulphuric acid so that the oxygen acts directly upon the nitrosyl sulphuric acid, the oxygen being supplied in such excess as to avoid the presence of red fumes at the top of the column.

17. The process which consists in forming nitric acid by the oxidation, in the presence of a catalyst, of a nitrosyl sulphuric acid solution formed by dissolving nitrogen peroxide in sulphuric acid by means of oxygen led in countercurrent in a column into the liquid nitrosyl sulphuric acid and sulphuric acid so that the oxygen acts directly upon the nitrosyl sulphuric acid, the oxygen being supplied in such excess as to avoid the presence of red fumes at the top of the column.

18. The process which consists in forming nitric acid by the oxidation of liquid nitrosyl sulphuric acid in sulphuric acid by means of oxygen led in countercurrent in a column into the liquid nitrosyl sulphuric acid and sulphuric acid so that the oxygen acts directly upon the nitrosyl sulphuric acid, the temperature at the top of the column being such as to cause the reabsorption of substantially all oxides of nitrogen.

19. The process which consists in forming nitric acid by the oxidation of a nitrosyl sulphuric acid solution formed by dissolving nitrogen peroxide in sulphuric acid by means of oxygen led in countercurrent in a column into the liquid nitrosyl sulphuric acid and sulphuric acid so that the oxygen acts directly upon the nitrosyl sulphuric acid, the temperature at the top of the column being such as to cause the reabsorption of substantially all oxides of nitrogen.

20. The process which consists in forming nitric acid by the oxidation, in the presence of a catalyst of liquid nitrosyl sulphuric acid in sulphuric acid by means of oxygen led in countercurrent in a column into the liquid nitrosyl sulphuric acid and sulphuric acid so that the oxygen acts directly upon the nitrosyl sulphuric acid, the temperature at the top of the column being such as to cause the reabsorption of substantially all oxides of nitrogen.

21. The process which consists in forming nitric acid by the oxidation, in the presence of a catalyst, of a nitrosyl sulphuric acid solution formed by dissolving nitrogen peroxide in sulphuric acid by means of oxygen led in countercurrent in a column into the liquid nitrosyl sulphuric acid and sulphuric acid so that the oxygen acts directly upon the nitrosyl sulphuric acid, the temperature at the top of the column being such as to cause the reabsorption of substantially all oxides of nitrogen.

In witness whereof I have hereunto signed my name this 4th day of December, 1926.

MARTIN BATTEGAY.